(12) United States Patent
Berthomieu et al.

(10) Patent No.: US 12,077,324 B2
(45) Date of Patent: Sep. 3, 2024

(54) METHOD FOR ASSEMBLING A PLURALITY OF DEVICES ON A SATELLITE STRUCTURE AND SATELLITE STRUCTURE SUPPORTING A PLURALITY OF DEVICES

(71) Applicant: AIRBUS DEFENCE AND SPACE SAS, Toulouse (FR)

(72) Inventors: Catherine Berthomieu, Toulouse (FR); Carole Chossiere, Toulouse (FR); Andrew Walker, Toulouse (FR); Franck Levallois, Toulouse (FR); Vincent Claudet, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 143 days.

(21) Appl. No.: 17/785,628

(22) PCT Filed: Dec. 9, 2020

(86) PCT No.: PCT/EP2020/085162
§ 371 (c)(1),
(2) Date: Jun. 15, 2022

(87) PCT Pub. No.: WO2021/122184
PCT Pub. Date: Jun. 24, 2021

(65) Prior Publication Data
US 2023/0050562 A1 Feb. 16, 2023

(30) Foreign Application Priority Data
Dec. 17, 2019 (FR) .................................. 1914668

(51) Int. Cl.
*B64G 1/64* (2006.01)
*B64G 1/10* (2006.01)
*B64G 1/22* (2006.01)

(52) U.S. Cl.
CPC .................. *B64G 1/64* (2013.01); *B64G 1/10* (2013.01); *B64G 1/223* (2023.08)

(58) Field of Classification Search
CPC ............. B64G 1/64; B64G 1/10; B64G 1/223
See application file for complete search history.

(56) References Cited

U.S. PATENT DOCUMENTS

| 5,624,088 A | 4/1997 | Fiore |
| 8,967,547 B2* | 3/2015 | Wong ..................... B64G 1/506 |
| | | 244/172.6 |

(Continued)

FOREIGN PATENT DOCUMENTS

| FR | 2642224 | 7/1990 |
| GB | 2173467 | 10/1986 |

OTHER PUBLICATIONS

French International Search Report and Written Opinion of the ISA for PCT/EP2020/085162, 12 pages, mailed Jan. 19, 2021.

(Continued)

*Primary Examiner* — Philip J Bonzell
*Assistant Examiner* — Cindi M Curry
(74) *Attorney, Agent, or Firm* — Nixon & Vanderhye P.C.

(57) ABSTRACT

A method for assembling devices on a satellite structure is disclosed including attaching the devices to a first face of a plate drilled with a through-hole provided with a fluid connector, on a second face of the plate, depositing a continuous peripheral bead of polymerisable adhesive composition and depositing a plurality of discontinuous and disjointed inner beads of polymerisable adhesive composition, pressing the second face of the plate against a continuous face of the structure, performing suction so as to create a pressure differential between the plate and the structure, at least partially polymerising the polymerisable adhesive (Continued)

compositions so as to form adhesive joints between the plate and the structure, and interrupting the suction.

20 Claims, 4 Drawing Sheets

(56) References Cited

U.S. PATENT DOCUMENTS

| | | | |
|---|---|---|---|
| 9,150,313 B2* | 10/2015 | Puig-Suari | B64G 1/428 |
| 10,538,341 B1* | 1/2020 | Fraze | B64G 1/443 |
| 2004/0261939 A1* | 12/2004 | Ogle | B26D 7/025 |
| | | | 156/523 |
| 2014/0039729 A1 | 2/2014 | Puig-Suari et al. | |
| 2014/0224939 A1 | 8/2014 | Wong et al. | |
| 2019/0226903 A1* | 7/2019 | Cannon | G01G 9/00 |
| 2023/0050562 A1* | 2/2023 | Berthomieu | B64G 1/10 |

OTHER PUBLICATIONS

English translation of the International Search Report for PCT/EP2020/085162, 2 pages, mailed Jan. 19, 2021.

* cited by examiner

METHOD FOR ASSEMBLING A PLURALITY OF DEVICES ON A SATELLITE STRUCTURE AND SATELLITE STRUCTURE SUPPORTING A PLURALITY OF DEVICES

CROSS REFERENCE TO RELATED APPLICATIONS

The present application is a National Phase of International Application Number PCT/EP2020/085162 filed Dec. 9, 2020, which designated the U.S. and claims priority benefits from French Application Number FR 1914668 filed Dec. 17, 2019, the entire contents of each of which are hereby incorporated by reference.

The present invention relates to the field of assembling space devices, in particular electronic devices, in an artificial satellite.

More particularly, the present invention relates to a method for assembling a plurality of devices on a support structure of an artificial satellite, as well as to an artificial satellite support structure on which a plurality of devices is assembled.

The invention further relates to an artificial satellite including such a support structure.

The manufacture of a satellite requires the assembly of various devices therein, in particular electronic devices, which are necessary for it to accomplish its mission. These various devices are assembled on structures of the satellite, commonly referred to as walls.

At present, the assembly of space devices on satellite walls is carried out device by device, which is time-consuming and restrictive. Moreover, the arrangement of the various devices on the same wall must be carefully thought out in advance, as any last-minute changes to the arrangement are particularly time-consuming and result in significant additional installation costs.

The present invention aims to overcome the drawbacks of the methods for assembling space devices on satellite walls, as proposed in the prior art, in particular the drawbacks set out hereinabove, by proposing a method that is simple to implement, and that enables the time required to assemble the devices on the wall of the satellite to be reduced. A further objective of the invention is that this method allows the devices to be arranged in a modular manner on the wall of the satellite. The invention further intends for the means of assembly to procure heat transfers between the devices and the wall of the satellite.

In order to achieve these objectives, the present inventors envisaged attaching various space devices, in particular devices belonging to the same functional subset, in a workshop, to a support plate which would then be attached to the wall of the satellite.

While looking for solutions to do this with the existing assembly techniques using intermediate plates, they found themselves confronted with numerous constraints for implementing these techniques, which made them inapplicable to the specific field of integrating devices on an artificial satellite wall.

The attachment of a plate to the wall of a satellite by screwing, on which plate a plurality of devices have been previously assembled, requires, for example, a significant plate thickness, of at least 4 mm, in order to be robust. Such a thickness is too penalising for the mass of the satellite when the plate has large dimensions, which are required in order to assemble a large number of devices thereon. The additional mass associated with thick plates is thus a hindrance to the generalisation thereof to a whole platform in the context of artificial satellites. Instead, the inventors sought to assemble devices on thin plates, less than or equal to 3 mm thick, which would themselves be attached to the walls of the satellites. To achieve this, they considered adhesive bonding techniques. However, none of the techniques proposed in the prior art for bonding a plate to a support panel, such as bonding by vacuum bagging or injection bonding, have been found to be suitable for implementation in a satellite for the assembly of large plates on a wall thereof. More specifically, these techniques require good accessibility to the parts to be assembled, which prohibits the use thereof in the assembly of large plates on a satellite wall, and/or they restrict the arrangement of the devices on the plate to a too great extent. Furthermore, some of these prior art techniques do not allow for satisfactory calibration of the adhesive joint sandwiched between the plate and the support structure. These techniques are also time-consuming and tedious to implement.

The present inventors have now developed a specific assembly method, implementing an intermediate plate, which overcomes the aforementioned drawbacks, and which achieves the objectives of the present invention, in the specific context of assembling devices on a satellite wall.

Thus, according to a first aspect, the present invention relates to a method for assembling a plurality of devices, in particular electronic devices, which can be of both the dissipative and non-dissipative type, on a support structure of an artificial satellite. This method comprises successive steps of:

attaching, via attachment members, each of the devices to a first face of a plate, this plate being drilled with a through-hole provided, at the first face of the plate, with a fluid connector;

on a second face of the plate opposite the first face, depositing a continuous peripheral bead of a first polymerisable adhesive composition and, within the perimeter formed by the peripheral bead, depositing a plurality of discontinuous and disjointed inner beads of a second polymerisable adhesive composition, the through-hole also being included within the perimeter formed by the peripheral bead;

pressing the second face of the plate, carrying the beads of polymerisable adhesive composition(s), against a continuous face of the support structure of the satellite;

performing suction, via the fluid connector, i.e. by way of the fluid connector, so as to create a negative pressure between the plate and the support structure, in the volume delimited by the peripheral bead;

at least partially polymerising each of the polymerisable adhesive compositions so as to form adhesive joints between the second face of the plate and the support structure; and interrupting the suction.

The beads of polymerisable adhesive composition are preferably deposited according to a profile such that the continuous peripheral bead is peripheral to the area of the second face of the plate that is located on the underside of the area where the devices are attached to the first face of the plate. The inner beads, on the other hand, are disposed within the perimeter delimited by the peripheral bead, in a disjointed manner, i.e. in such a way that, together and/or with the peripheral bead, they do not delimit any closed area within this perimeter. As a result, air is free to circulate in all areas of the perimeter delimited by the peripheral bead.

The term "continuous face of the support structure" is understood in the present description to mean that at least the area for receiving the plate on the face of the support structure, i.e. the area of this face against which the plate will be pressed, is continuous; or at least that the area of this face against which the perimeter of the plate delimited by the peripheral bead will be pressed, is continuous.

When pressing the second face of the plate carrying the beads of polymerisable adhesive composition(s) against the continuous face of the support structure, it is understood that it is the beads of polymerisable adhesive composition(s), which are prominent on the second face of the plate, which are actually pressed against the face of the support structure. A closed and airtight volume is thus created between the plate and the face of the support structure, delimited at the periphery thereof by the peripheral bead.

The term "fluid connector" is understood to mean a connector that allows a fluid, in particular air, to pass between areas/elements that it connects or that it is intended to connect, more specifically, within the context of the present invention, between the closed volume situated between the plate and the support structure and delimited at the periphery thereof by the peripheral bead, and an area or an element external to this volume.

The fluid connector of the plate according to the invention is more specifically intended to be connected to a suction system, and is preferably configured such that it can be connected to such a suction system, in particular to a hose belonging to such a system.

In order to implement the suction step, in specific embodiments of the invention, the method according to the invention comprises a step of connecting the fluid connector to a suction system, and then switching on this suction system, so as to suck in some of the air contained in the volume situated between the plate and the support structure and delimited at the periphery thereof by the peripheral bead, via the fluid connector. The method according to the invention preferably further comprises, at the end of the suction step, a step of disconnecting the suction system from the fluid connector.

Advantageously, when the suction step is implemented, a negative pressure is created between the plate and the face of the support structure, in the volume delimited by the peripheral bead wedged between the plate and the face of the support structure, which negative pressure is uniform throughout this volume. In this description, the term "negative pressure" is understood in a conventional manner to mean a pressure lower than the surrounding pressure, in this case a pressure lower than atmospheric pressure.

The negative pressure thus created between the plate and the face of the support structure tends to bring the surfaces thereof closer to one another by a suction effect. In doing so, the beads of polymerisable adhesive composition(s) compressed between these surfaces are spread. When these beads have been deposited uniformly, the resulting adhesive joints are thus advantageously of uniform height. This calibration of the beads advantageously meets the requirements of the satellite field. The time taken for the beads of polymerisable adhesive composition(s) to reach their maximum spread depends in particular on the viscosity of the polymerisable adhesive composition(s) and the amplitude of the negative pressure created between the plate and the support structure. Preferably, the operating conditions of the method are chosen such that this time is a few tens of minutes, in particular about 20 minutes. For the vast majority of the polymerisable adhesive compositions, polymerisation has barely begun at this point, and so does not interfere with the spreading of the beads.

The polymerisation of the polymerisable adhesive compositions is preferably carried out until a degree of polymerisation of at least 80% is achieved before the suction is interrupted. The time and temperature conditions for achieving such a degree of polymerisation are easily determined by a person skilled in the art, as a function of the one or more specific polymerisable adhesive compositions used. Where these compositions are commercially available, the optimum parameters for polymerisation are given in the suppliers' data sheets. The adhesive joints formed by the method according to the invention ensure that the plate carrying the devices is attached to the support structure of the satellite. The assembly obtained advantageously meets the mechanical requirements, in particular in terms of stiffness and stress resistance, and where necessary the thermal requirements, set out for the satellite. This is made possible with a minimum quantity of material, since the method according to the invention can use, and is particularly adapted for, plates of a very thin thickness, less than or equal to 3 mm and in particular of about 2 mm.

In the method according to the invention, the peripheral bead acts both as a precursor of a structural adhesive joint, and as a sealant sealing the volume between the plate and the support structure allowing the negative pressure to be created between these elements.

The plate implemented in this method can have large dimensions, for example dimensions greater than or equal to 500 mm in length and/or 500 mm in width, without affecting the efficiency and reliability of the assembly. A plate of large dimensions also offers, in the preferred case where it is made of a thermally conductive material, a sufficient dissipative surface area to allow heat exchanges to take place between the devices and the support structure.

A functional subset of space devices can thus be attached to one and the same plate. This attachment can be carried out in the workshop, and the functional subset can advantageously be pre-tested in the workshop, prior to the assembly thereof in the satellite. The integration of the devices into the satellite is then quickly achieved by bonding the plate, this bonding being assisted by suction in accordance with the invention, against the face of the support structure of the satellite.

The method according to the invention thus makes it possible to reduce the time required to integrate the devices into the satellite, and more generally to reduce the cycle time in the satellite assembly lines, as well as the associated costs.

The method according to the invention further allows for a high degree of modularity in the arrangement of the devices on the support structure. A last-minute design change requires only the entire plate to be changed, and not the individual displacement of each device already attached in the satellite.

The design, manufacture and justification of the support structure are also advantageously simplified, as the presence of inserts for the attachment of each device is no longer necessary, and the plate can act as a reinforcement, such that the support structure to which it is attached can, for example, consist of a thin-aluminium-skinned honeycomb composite panel. The face of the support structure intended to receive the plate must be continuous, at least in the area for receiving the plate, and preferably substantially planar. When the face of the support structure on which the plate is to be assembled is initially not continuous, the method according to the invention comprises a step of plugging the holes present therein, at least in the area for receiving the plate, in order to ensure the airtightness thereof and to allow for the creation of a negative pressure between this face and the plate.

The method according to the invention, while not requiring any additional sealing element usually used for vacuum bonding, advantageously allows for structural and, where necessary, thermally conductive, bonding, on a satellite support structure, of large plates equipped with heavy devices, the weight whereof can be up to 2 kg for example, while guaranteeing a homogeneous and calibrated thickness of adhesive between the plate and the support structure, making it possible to optimise the performance of the adhesive and to meet the particularly stringent requirements of the space field.

The method according to the invention can further comprise one or more of the features described hereinbelow, which must be considered singly or according to any combinations technically effective.

The plate implemented can be made of any material or mixture of materials, these materials being preferably lightweight, preferably thermally conductive, and compatible with the mechanical environments to which the plate will be exposed when the satellite is in operation.

Preferably, the plate is made of aluminium and/or aluminium alloy.

The thickness thereof is preferably less than or equal to 3 mm, and preferably less than or equal to 2 mm, for example about 2 mm. It can have a length of 500 mm or more, and/or a width of 500 mm or more. It goes without saying that the method according to the invention is equally applicable to plates of smaller dimensions.

The plate implemented according to the invention also preferably has a continuous and substantially planar surface, within manufacturing tolerances.

The plate can be provided with a single through-hole, which is associated with a fluid connector, or with a plurality of such holes, each being associated with such a fluid connector. In such a configuration, all the fluid connectors are implemented simultaneously for the suction step, or those that are not implemented are plugged in an airtight manner. Apart from the one or more through-holes required to implement the suction step, the plate preferably does not comprise any through-holes, except in the vicinity of the peripheral edges thereof. The method according to the invention then provides for the peripheral bead to be deposited such that the perimeter it delimits does not include these holes. Alternatively, the method according to the invention includes a prior step of plugging the through-holes in the plate in an airtight manner. Similarly, the method according to the invention can comprise, where necessary, a step of making the attachment of the devices to the plate airtight.

In the same way, the method according to the invention can include a step of making the face of the support structure intended to receive the plate airtight, so as to be able to create a negative pressure between the plate and this face of the support structure.

Any combination of space devices can be attached to the plate. Preferably, the devices contributing to a same function of the satellite are grouped together on a same plate.

The devices can be attached to the plate by any conventional attachment members. Preferably, these attachment members do not protrude from the surface of the second face of the plate, or do so only slightly, preferably by a height of less than or equal to 0.1 mm. The attachment members can in particular be inserted into the through- or non-through-holes extending through the thickness of the plate, from the first face thereof. These can in particular be screws that screw into such threaded holes.

The fluid connector can be attached, for example, by bonding against the first face of the plate, around the through-hole. It can, for example, take the form of a hollow rigid body, attached to the plate at a first end, around the through-hole, and provided at a second end with means for the assembly thereof, preferably for the reversible assembly thereof, in particular by mechanical cooperation, with a suction system.

In preferred implementations of the invention, the first polymerisable adhesive composition and the second polymerisable adhesive composition are identical. The polymerisable adhesive compositions implemented in the method according to the invention are preferably chosen from among thermosetting resins, preferably of a thixotropic nature.

Preferably, the one or more polymerisable adhesive compositions are selected to form, after polymerisation/cross-linking, an adhesive joint having at least one, preferably several and preferably all, of the following properties:

good mechanical strength properties, in particular a shear strength of more than 15 MPa and a bonding strength of more than 5 MPa, at ambient temperature, over a wide temperature range, for example from −55° C. to 180° C.;

a thermal conductivity of at least 0.2 W/m.° C.;

a high compressive strength;

and easy to use.

The viscosity of the one or more polymerisable adhesive compositions is preferably chosen such that it is sufficiently high for these compositions to be easy to apply in the form of thin beads, in particular with a height of less than or equal to 0.2 mm, and such that they do not flow when at rest after they have been applied in beads on the plate, even when the plate is inclined or placed vertically, or even placed horizontally, the second face of the plate, carrying the beads of adhesive composition(s) being directed upwards or even downwards, while allowing these beads to spread out under the effect of shearing forces exerted thereon during the suction step of the method.

The polymerisable adhesive compositions can be of the one-component or two-component type, one of the components can then be a curing agent or polymerisation catalyst.

The polymerisable adhesive compositions implemented according to the invention are preferably chosen to start their polymerisation after at least 1 hour, preferably after at least 2 hours, in the open air and at ambient temperature; and, for example, to require a time for reaching total polymerisation of at least 1 day at 25° C.

The polymerisable adhesive compositions according to the invention can, for example, be chosen from among acrylate, acrylate- and/or methacrylate-based, polyester, epoxy or polyurethane type resins.

Prior to the step of attaching the devices to the plate, the method according to the invention can include a step of preparing the surface of the plate, at least of the second face thereof, and where necessary of the first face thereof, with a view to improving the subsequent bonding to the support structure and the mechanical strength of the assembly obtained.

This surface preparation step can be carried out in any conventional manner, in particular by cleaning with a solvent, such as isopropyl alcohol, optionally after a surface abrasion step; preferably, however, it does not include stripping the surface of the second face of the plate.

The faces of the plate and the support structure intended to be attached to one another can also be coated with an adhesion-promoting primary coating prior to implementing the method according to the invention, in particular as part of the manufacturing method thereof.

In specific implementations of the invention, prior to the step of depositing beads of polymerisable adhesive composition on the plate, or after this step but prior to the pressing of the second face of the plate against the face of the support structure, the method comprises attaching, to this second face, a plurality of templates, the height whereof is less than the height of the beads of polymerisable adhesive composition(s). During the subsequent suction step, these templates constitute stops imposing a minimum distance between the plate and the face of the support structure towards which it is pulled under the suction effect. The height of the templates thus corresponds to the desired height of the adhesive joints formed during the implementation of the method according to the invention. By way of example, the height of the templates can be equal to 0.1 mm.

These templates are preferably distributed over the entire surface area of the second face of the plate, preferably within the perimeter delimited by the peripheral bead. They can in particular consist of pads made of adhesive tape.

The step of depositing the peripheral bead and the step of depositing the inner beads can be carried out simultaneously, or in any order. Preferably, the inner beads are deposited before the peripheral bead, according to a pre-established profile that takes into account the specific configuration of the devices and the intended positioning thereof on the support structure.

Any conventional means of depositing a bead of polymerisable adhesive composition can be implemented for this purpose, for example an applicator gun.

The inner beads and the peripheral bead can have the same height. They can be calibrated to the same size, i.e. so as to have the same cross-sectional shape and the same height. This height is chosen so that, after spreading and polymerisation, adhesive joints of the desired height can be obtained, preferably less than or equal to 0.2 mm, for example between 0.1 mm and 0.2 mm.

In alternative implementations of the invention, the inner beads and the peripheral bead do not have the same shape and/or the same dimensions. In such an alternative implementation, the peripheral bead is preferably deposited on the second face of the plate such that the height thereof is greater than that of the inner beads. Such a feature advantageously improves the airtightness of the volume situated between the plate and the support structure, allowing for the subsequent creation of a negative pressure between these elements.

In particular implementations of the invention, at least one inner bead is disposed opposite each of the devices attached to the first face of the plate, preferably at or in the vicinity of the attachment members associated with each device, so as to ensure that the bead extends beneath these attachment members after it has been spread under the suction effect. Such a feature advantageously improves the mechanical strength of the assembly, while ensuring a good transfer of the mechanical forces between the devices and the support structure.

Furthermore, in the configurations wherein the one or more polymerisable adhesive compositions are thermally conductive, such a positioning of some of the inner beads beneath, or in close proximity to, the device attachment members, ensures an efficient transfer of the heat flows between the devices and the support structure, as well as good thermal dissipation over the entire surface area of the plate.

The number of inner beads deposited on the second face of the plate, and the extent of the surface area of the plate covered by these beads after they have spread under the suction effect, depend on the expected performance levels, in terms of mechanical strength and heat transfer, of the assembly formed. The determination thereof falls within the competence of a person skilled in the art, for each particular case, taking into account the fact that the covered surface area of the plate must be sufficiently large to procure these performance levels, while allowing for the creation, between the plate and the support structure, of a negative pressure that is sufficient to obtain the targeted degree of spreading of the beads.

In the configurations wherein the support structure contains integrated heat pipes, the deposition of the inner beads and the pressing of the second face of the plate against the face of the support structure are preferably carried out in such a way that at least one of the inner beads covers or crosses a heat pipe, preferably perpendicularly thereto. The advantage of this feature is that it maximises the dissipation of the heat flows generated by the devices.

Preferably, these steps are carried out in such a way that at least one, and preferably several, inner beads cross a plurality of the heat pipes, preferably perpendicularly thereto. This advantageously ensures that the heat flows are drained even in the case of a degraded operating mode due to a malfunctioning heat pipe.

The step of pressing the second face of the plate against the support structure, which will be referred to in the present description as the engagement step, can be carried out in any position, with the plate being disposed horizontally, vertically or inclined relative to the vertical.

In specific implementations of the invention, the method comprises a step of clamping the plate against the support structure, prior to performing suction, so as to prevent the plate from moving relative to the support structure, other than to bring it closer thereto, and thus to prevent any degradation of the beads of polymerisable adhesive composition, in particular of the peripheral bead, which must ensure that the assembly is airtight. The clamping can be carried out using any conventional tool. It can in particular implement rods which are attached on the one hand to the support structure and on the other hand to a panel disposed behind the plate, opposite the support structure, and passing through through-holes made in the plate for this purpose, outside the perimeter delimited by the peripheral joint on the surface thereof.

In specific implementations of the invention, the suction is applied, via a suction hose connected to the fluid connector, so as to obtain a relative pressure between the plate and the support structure of between −0.1 and −0.75 bar, preferably between −0.4 and −0.6 bar.

The suction is preferably maintained throughout the duration of the step of at least partially polymerising the polymerisable adhesive compositions, preferably until this polymerisation is complete or at least reaches 80%. This feature prevents the formation of holes or defects in the adhesive joints, which could reduce the mechanical strength of the assembly.

At the end of the method according to the invention, the clamping tool is preferably removed. The plate to which the space devices are attached is thus firmly assembled, by bonding, to the support structure of the satellite.

Another aspect of the invention relates to an artificial satellite support structure, on which a plurality of devices, in particular electronic devices, is assembled, and which can be obtained using a method according to the present invention, as defined hereinabove.

According to the invention, the devices are attached by attachment members to a first face of a plate, and a second face of this plate, opposite the first face, is attached against the face of the support structure by a set of adhesive joints, and preferably only by this set of adhesive joints. This set of adhesive joints comprises a continuous peripheral adhesive joint and, within the perimeter formed by this peripheral adhesive joint, a plurality of discontinuous and disjointed inner adhesive joints.

In specific embodiments of the invention, the plate further includes a through-hole, opening out at the second face thereof inside the perimeter delimited by the peripheral adhesive joint, and around which is attached, optionally, at the first face of the plate, a fluid connector capable of being connected to a suction system. The plate can optionally include a plurality of such through-holes. This/these through-hole(s) can otherwise have been plugged, in particular using a suitable resin or paste.

The support structure according to the invention can have one or more of the features described hereinabove with reference to the assembly method according to the invention, whether these features relate to the space devices, to the plate, to the adhesive joints or to the support structure itself.

In particular embodiments of the invention, the plate has a thickness, measured between the first face thereof and the second face thereof, comprised between 1 and 3 mm, in particular of approximately 2 mm. The length and/or width thereof are also preferably greater than or equal to 500 mm.

The adhesive joints are preferably all made of the same material, preferably a thermoset resin.

These joints have substantially the same height, within the flatness tolerances of the second face of the plate and of the face of the support structure. They are preferably all calibrated to the same gauge. For example, they have a flattened shape with a height comprised between 0.1 and 0.2 mm and a width comprised between 10 and 35 mm, for example of about 30 mm, or comprised between 10 and 25 mm.

Preferably, at least one inner adhesive joint is disposed opposite each of the devices, preferably at the attachment members associated with this device, i.e. in a position covering the lower part of these members, or opposite these members.

In specific embodiments of the invention, the support structure contains integrated heat pipes, and at least one of the adhesive joints crosses one of these heat pipes, preferably perpendicularly to this heat pipe. Preferably, at least one, preferably several, of the adhesive joints crosses a plurality of the heat pipes, preferably perpendicularly thereto.

Another aspect of the invention relates to an artificial satellite including a support structure according to the invention, this structure having one or more of the features described hereinabove or hereinbelow.

The features and advantages of the invention will be better understood upon reading the description of the example implementations provided hereafter for illustrative purposes only and in no way limiting the scope of the invention, with reference to FIGS. 1 to 13, wherein:

FIG. 1 diagrammatically shows a satellite support structure, a plate and space devices intended to be assembled by an assembly method according to the invention.

Figure 13:
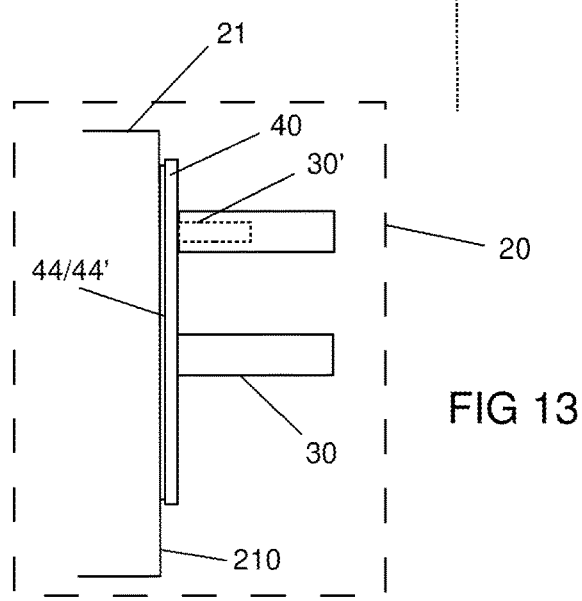

FIG. 13 diagrammatically shows an artificial satellite including a support structure on which a plurality of devices is assembled, in accordance with the present invention.

It should firstly be noted that the figures are not to scale. In particular, in order to ease the understanding of the invention, some elements are artificially magnified in relation to others, in some or all of the figures, and the scales used to show the same element are not always identical in all of the figures.

The method according to the invention realizes the assembly, on a support structure 21 of an artificial satellite 20, of a plurality of space devices 30, 30'. These devices can be of any conventional type used to perform various functions of the satellite. The support structure 21 can also be of any type conventionally used to carry space devices of a satellite. Such a support structure is commonly referred to as a "wall" of the satellite. It can be made of any conventional material, in particular composite material or metal material.

The method according to the invention implements a plate 40 in order to realize the assembly.

Figure 1:
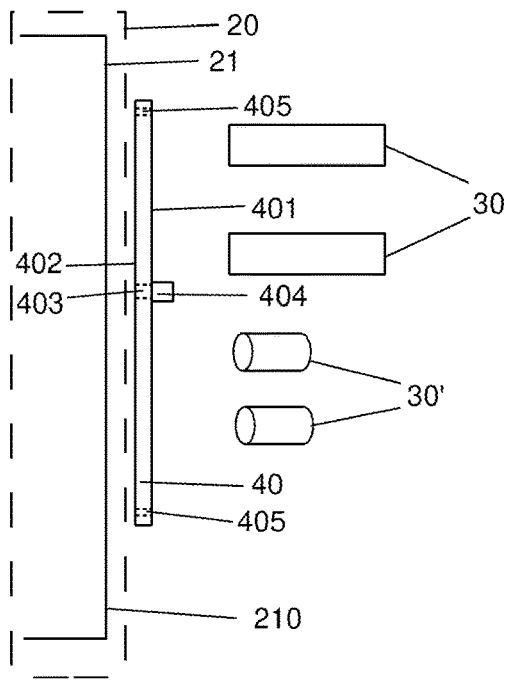

These various elements are illustrated, separately from one another, in FIG. 1. In this figure, the satellite 20 is represented schematically by a dotted outline. The support structure 21 includes a face 210 intended to receive the plate 40, of which at least the area for receiving the plate is continuous and substantially planar.

The plate 40 is preferably thin, i.e. less than or equal to 3 mm in thickness. For example, it is 2 mm thick. It also preferably has large dimensions so as to be able to support a large number of devices of the satellite, for example all of the devices contributing to a function or sub-function block.

In the example embodiment shown in the figures, the plate 40 has a rectangular shape, such a shape not in any way limiting the scope of the invention. The plate 40 can be of any shape, in particular a shape adapted to the specific configuration of the satellite 20 and of the support structure 21.

The plate 40 preferably has dimensions greater than or equal to 500 mm in length and/or 500 mm in width.

It can be made of any material suitable for implementation in the space field. This material is preferably lightweight, and preferably thermally conductive. Aluminium and its alloys are particularly preferred within the scope of the invention.

The plate 40 includes a first face 401, intended to receive the devices 30, 30', and a second opposite face 402. It preferably has a continuous and substantially planar surface on each of the faces 401, 402 thereof, within manufacturing tolerances.

The plate 40 is drilled through the thickness with a through-hole 403, preferably located in the central part thereof, away from the peripheral edges of the plate 40. A fluid connector 404 is attached around this hole 403, on the first face 401 of the plate 40. In the example embodiment shown in the figures, this fluid connector 404 is in the form of a sleeve, which is attached to the first face 401 of the plate 40 at a first end. This attachment is in particular produced by bonding. The fluid connector 404 is configured, at the second end thereof, such that it can be connected to a suction system, more particularly to a hose of a suction system.

In the embodiment shown in the figures, the plate 40 includes a single through-hole 403 and a single fluid connector 404. However, such an embodiment in no way limits the scope of the invention, and the plate 40 can be provided with a plurality of through-hole 403/fluid connector 404 pairs, each of these pairs being implemented in the same manner.

The plate 40 preferably further includes a plurality of through-holes 405 distributed along the peripheral edges thereof and configured to receive rods of a clamping tool.

Figure 2:
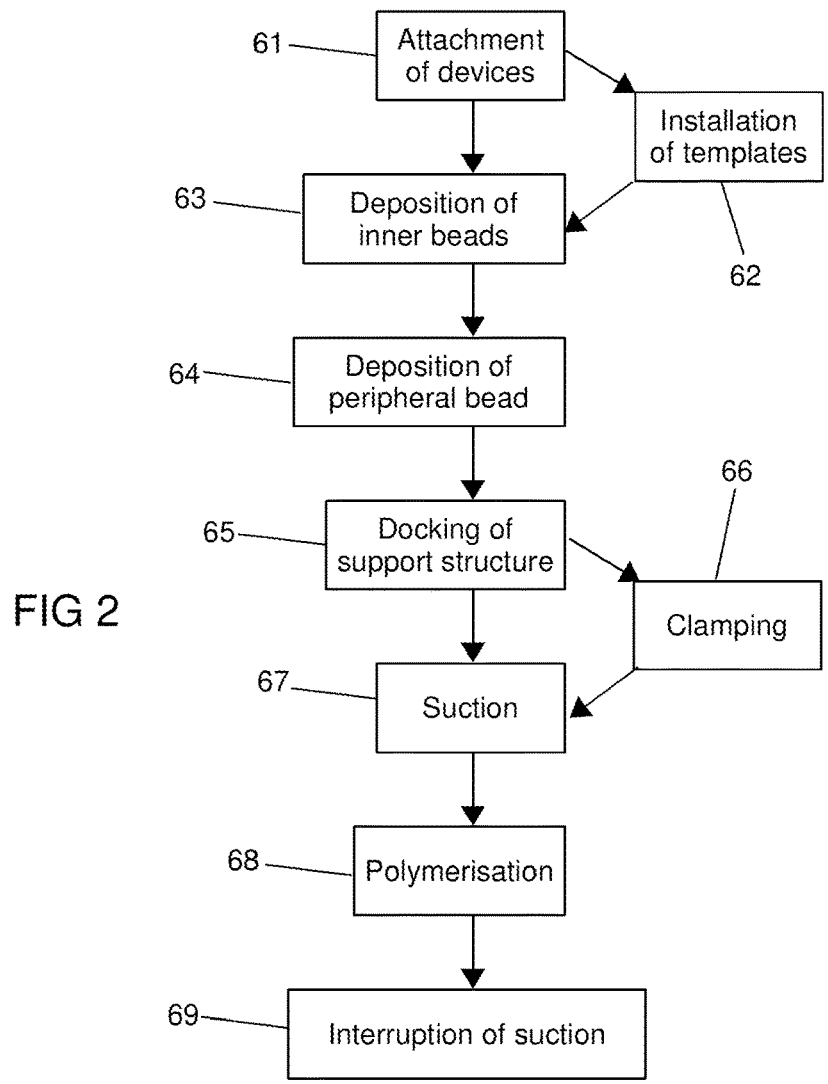
FIG. 2 shows a block diagram illustrating the main steps of an assembly method according to the invention.

The main steps of a method according to the invention are shown in FIG. 2. Diagrammatically, the method comprises the following successive steps. Each of these steps will be described in more detail further on in this description, with reference to FIGS. 3 to 13, which show different successive stages of advancement of the method according to the invention.

The assembly method according to the invention comprises, in a first step, attaching 61 the space devices 30, 30' to the first face 401 of the plate 40. Before or after this step, it can comprise a step of preparing the surface of the plate 40, at least of the second face 402 thereof. This surface treatment can consist of cleaning, in particular with a solvent, more particularly with isopropyl alcohol, optionally preceded by surface abrasion.

The method then comprises an optional step 62 of installing templates on the second face 402 of the plate 40. This step can be carried out before or after the following steps 63 and 64, which consist in depositing beads of polymerisable adhesive composition(s) on the second face 402 of the plate 40, respectively inner beads in step 63 and a peripheral bead in step 64. The deposition 64 of the peripheral bead can be carried out before, after or simultaneously with the deposition 63 of the inner beads. Preferably, the deposition 64 of the peripheral bead is carried out after the deposition 63 of the inner beads.

Alternatively, the step 62 of installing templates can be interposed between the steps 63 and 64 of depositing the beads of polymerisable adhesive composition(s) on the second face 402 of the plate 40.

After the deposition 63, 64 of the beads of polymerisable adhesive composition(s) on the second face 402 of the plate 40, the method comprises a step 65 of pressing the second face 402 of the plate 40, carrying the beads of adhesive composition, against the face 210 of the support structure 21. This step is referred to in the present description as the step of docking of the support structure.

The method then comprises an optional step 66 of clamping the plate 40 to the support structure 21.

Suction 67 is then performed, via the fluid connector 404, between the plate 40 and the support structure 21, so as to cause the latter to move closer to one another, and to cause the beads of polymerisable adhesive composition(s) to spread. The polymerisation 68 of the polymerisable adhesive composition(s) is then performed to form adhesive joints between the plate 40 and the support structure 21.

The final step 69 of the method consists of interrupting the suction and, where necessary, of unclamping the plate 40 and the support structure 21.

Each of these steps is described in more detail hereinbelow.

Figure 3:
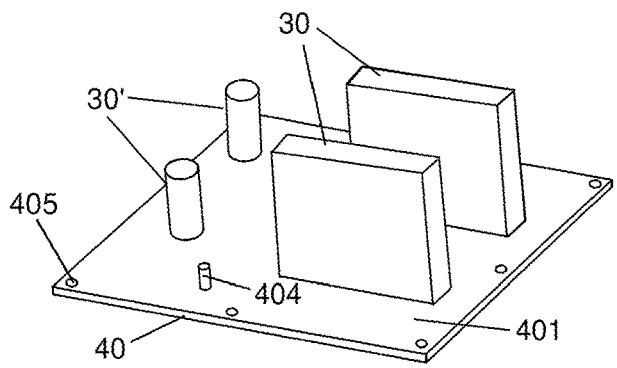
FIG. 3 shows a plate and space device assembly obtained after a first step of an assembly method according to the invention.

In the first step 61 of the method according to the invention, the space devices 30, 30' are attached to the first face 401 of the plate 40, as shown in FIG. 3. In the present example embodiment, four devices 30, 30' are attached to the plate 40. It goes without saying that such a number does not limit the scope of the invention.

The positioning of the devices 30, 30' relative to one another on the plate 40 is dictated by the specific requirements of the intended mission of the satellite 20, and falls within the competence of a person skilled in the art. The devices 30, 30' are preferably positioned away from the peripheral edges of the plate 40, and so as not to interfere with the connection of the fluid connector 404 to a suction system.

The devices 30, 30' can be attached to the plate 40 by means of any suitable attachment member 31, for example by means of screws or studs that attach into the thickness of the plate 40. Preferably, the attachment members 31 do not protrude from the second face 402 of the plate 40, or only by a height of less than or equal to 0.1 mm. The attachment is made airtight at the second face 402 of the plate 40.

Figure 4:
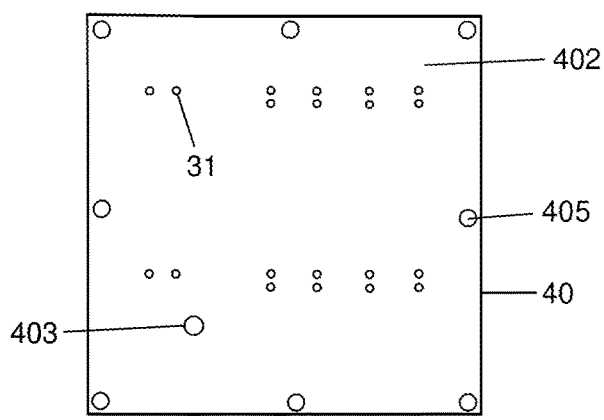
FIG. 4 shows the second face of the plate of FIG. 3.

The second face 402 of the plate 40, obtained at the end of the step 61 of attaching the devices 30, 30' to the plate 40, is shown in FIG. 4. This figure shows the lower end of the attachment members 31, the through-hole 403 intended to procure suction and the through-holes 405 for clamping, distributed along the peripheral edges of the plate 40, around the entire contour thereof.

Templates 41 are then attached (step 62) to the second face 402 of the plate 40. These templates, which have the function of adjusting the final height of the adhesive joints that will be formed between the plate 40 and the support structure 21, have a height corresponding to the desired final height of these adhesive joints. This height is in particular comprised between 0.1 and 0.2 mm. It is preferably equal to 0.1 mm.

Figure 5:
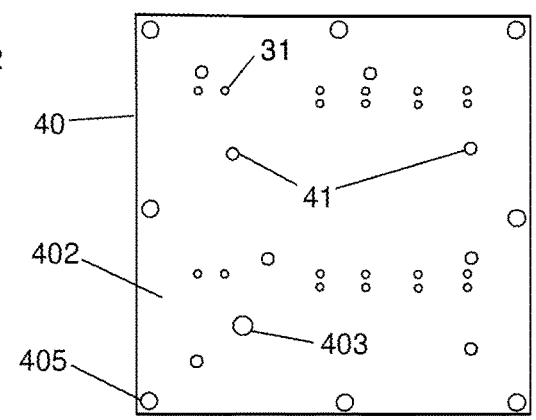
FIG. 5 shows the second face of the plate of FIG. 4 after the attachment of templates to the surface thereof in accordance with the invention.

The templates 41 can in particular be constituted by pads made of adhesive tape. They are distributed over the entire surface area of the second face 402 of the plate 40, as shown in FIG. 5.

Beads of polymerisable adhesive composition(s) are then deposited on the second face 402 of the plate 40.

All of the beads can be made of the same composition, or different compositions can be used for different groups of beads.

The one or more polymerisable adhesive compositions are preferably chosen to: form, after polymerisation, adhesive joints with a good mechanical strength, compatible with the requirements of the space field, and thermally conductive; to be easy to use, and to have a polymerisation start time of at least 1 hour in the open air and at ambient temperature. The Brookfield viscosity thereof, measured at 25° C., is preferably between 1,000 and 2,000 poise, preferably between 1,200 and 1,800 poise, and more preferably between 1,400 and 1,800 poise, such that on the one hand, the beads deposited on the plate 40 do not flow, and on the other hand, they can be flattened under the effect of a significant force exerted thereon by the bringing together of the plate 40 and the support structure 21 caused by the application of the suction 67.

The one or more polymerisable adhesive compositions are in particular chosen from among adhesive precursor compositions of the polyurethane, polyacrylate, epoxide, polyester, etc. type.

In the example embodiment described hereinbelow, for convenience purposes, the specific example of the implementation of one and the same polymerisable adhesive composition for all of the beads is used, although such an embodiment in no way limits the scope of the invention.

The deposition of the various beads of polymerisable adhesive composition on the second face 402 of the plate 40 is, for example, carried out by means of a conventional applicator gun. In some embodiments of the invention, the beads are all deposited according to the same gauge, i.e. such that all of the beads have the same height and cross-sectional shape. In alternative embodiments of the invention, some of the beads, in particular the peripheral bead, are higher than the others.

By way of example, the beads of polymerisable adhesive composition have a semi-circular cross-section, with a diameter of 3 mm, which is such that the height of the beads, after a spreading of 30 mm caused by the suction step 67, is comprised between 0.1 and 0.2 mm, according to the flatness tolerances of the surface of the plate 40 and of the surface of the face 210 of the support structure 21 which are bonded to one another during the implementation of the method according to the invention.

The method according to the invention comprises the deposition 63, on the second face 402 of the plate 40, of a plurality of so-called inner beads 42, 42' of polymerisable adhesive composition, these beads being discontinuous and disjointed, and being disposed away from the peripheral edges of the plate 40. It goes without saying that none of these beads 42, 42' blocks the through-hole 403.

Figure 6:
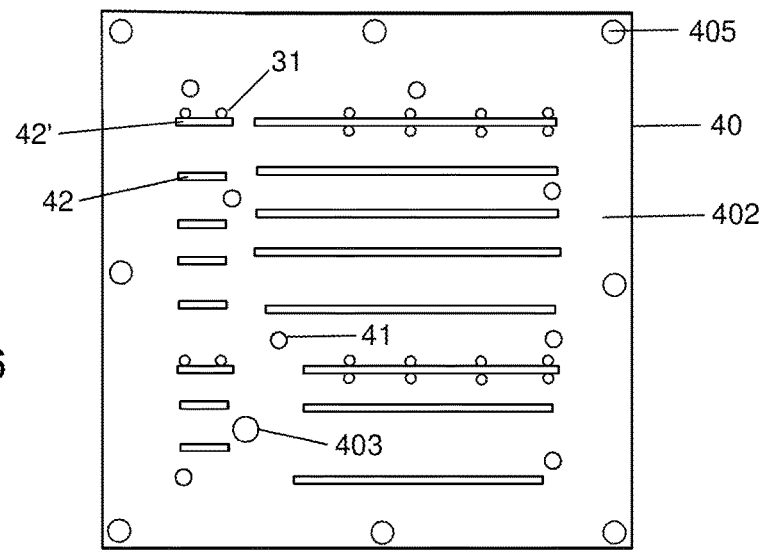
FIG. 6 shows the second face of the plate of FIG. 5 after the deposition of inner beads of the polymerisable adhesive composition on the surface thereof in accordance with the invention.

At least part of the inner beads, referred to here with the reference numeral 42', are deposited beneath the attachment interfaces for attaching the devices 30, 30' to the plate 40, i.e. beneath the attachment members 31, or in close proximity to the underside of these attachment members 31, as shown in FIG. 6. The other inner beads 42 are positioned at different locations on the second face 402 of the plate 40, distributed over the entire surface area thereof. In the example embodiment shown in the figures, the inner beads 42, 42' are all disposed parallel to one another. Such a configuration in no way limits the scope of the invention.

Figure 7:
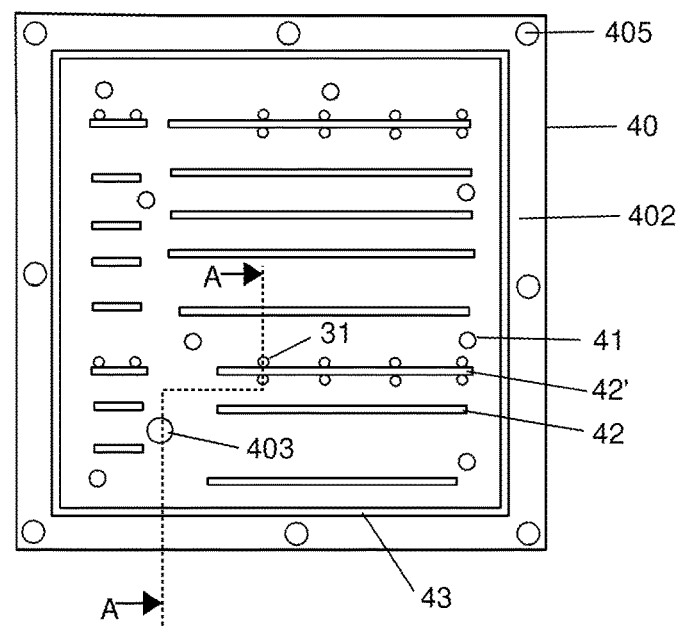
FIG. 7 shows the second face of the plate of FIG. 6 after the deposition of a peripheral bead of polymerisable adhesive composition on the surface thereof in accordance with the invention.

The method according to the invention then comprises depositing 64 a peripheral bead 43 of polymerisable adhesive composition on the second face 402 of the plate 40. This peripheral bead 43 is preferably disposed in the vicinity of the peripheral edges of the plate 40, so as to delimit a perimeter containing the inner beads 42, 42', the through-hole 403 and the templates 41, as shown in FIG. 7. However, the through-holes 405 must lie outside this perimeter, between the peripheral bead 43 and the edges of the plate 40.

Figure 8:
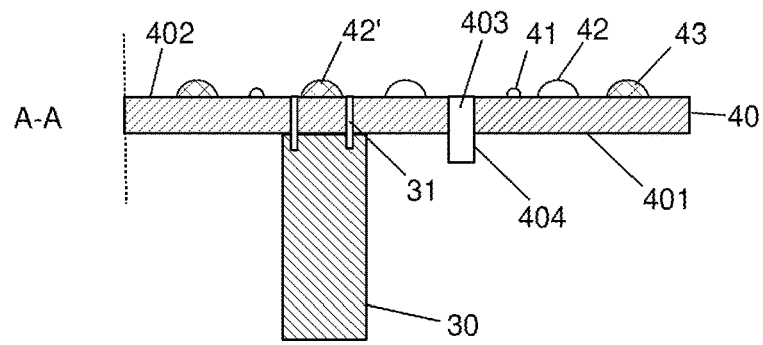
FIG. 8 shows a sectional view along A-A of the plate of FIG. 7.

A cross-sectional view along A-A of the resulting assembly is shown in FIG. 8. It shows the peripheral bead 43, the through-hole 403, inner beads 42 and an inner bead 42', disposed on the underside of a device 30, opposite the latter, between two attachment members 31.

The method according to the invention then comprises pressing 65 the second face 402 of the plate 40 against the face 210 of the support structure 21. This face 210 is preferably continuous and substantially planar, within manufacturing tolerances, at least in the area intended to receive the plate 40, referred to as the area for receiving the plate 40. When this face 210 is initially drilled with holes, these holes are plugged prior to the engagement step, so as to ensure the airtightness thereof.

Figure 9:
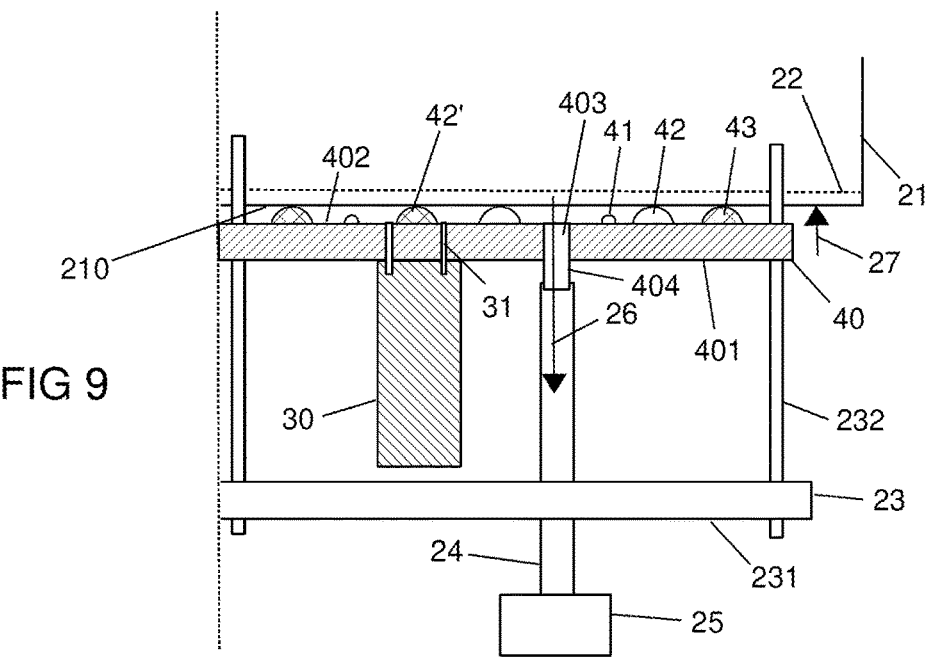
FIG. 9 shows a sectional view of the plate of FIG. 8 clamped to the support structure, in accordance with the invention, with suction being applied so as to create a negative pressure between the plate and the support structure.

If the support structure 21 comprises integrated heat pipes 22, shown diagrammatically as a dotted line in FIG. 9, engagement is achieved in such a way that at least part of the inner beads 42, 42' cross at least some of these heat pipes 22 in a substantially perpendicular manner. This advantageously allows for better dissipation of the thermal energy generated during the operation of the devices 30, 30', even in degraded modes wherein one or more heat pipes are malfunctioning.

The engagement step 65 can be carried out in all possible positions of the support structure 21 and of the plate 40. For this purpose, the plate 40 can be positioned vertically, horizontally or inclined at an angle to the horizontal, and the second face 402 thereof can then be directed upwards or downwards.

A tool 23 can then be used for the clamping 66 of the plate 40 against the support structure 21. This tool can be of any conventional type. By way of example, it comprises a back plate 231 integral with a plurality of rods 232 that attach to the support structure 21, passing through the through-holes 405 of the plate 40. This clamping 66 immobilises the plate 40 relative to the support structure 21, in a reversible manner, for all movements other than that of bringing these two elements closer to one another.

The method according to the invention then comprises connecting the fluid connector 404 to a hose 24 of a suction system 25, and applying suction 67, in the direction shown by the reference numeral 26 in FIG. 9. This suction is preferably carried out in such a way as to establish, between the plate 40 and the support structure 21, in the volume delimited by the peripheral bead 43, a negative pressure such that the relative pressure between the plate 40 and the support structure 21 is comprised between −0.4 and −0.6 bar. This suction has the effect of pressing the plate 40 more tightly against the face 210 of the support structure 21, as shown by the reference numeral 27 in FIG. 9. This movement has the effect of compressing the beads 42, 42', 43, all with the same force, and causes them to spread between the plate 40 and the face 210 of the support structure 21. This results in the configuration shown in FIG. 10. The spread beads all have the same height which is equal to that of the templates 41.

All of these steps were preferably carried out in a shorter time than that required for the polymerisable adhesive composition to begin polymerisation, or for 10% of this polymerisation to have been achieved. This time is generally a few tens of minutes, in particular about 20 minutes, but can be as long as 150 minutes or more, depending on the polymerisable adhesive composition.

The method according to the invention then comprises a step of at least partially polymerising 68 the adhesive composition, preferably until a degree of polymerisation of at least 80% is achieved. This polymerisation can be carried out at ambient temperature, i.e. at about 20 to 25° C., or at a higher temperature, with heating. The duration of this step depends on the polymerisation characteristics of the specific composition implemented. It is within the competence of a person skilled in the art to determine this for each specific polymerisable adhesive composition.

Figure 10:
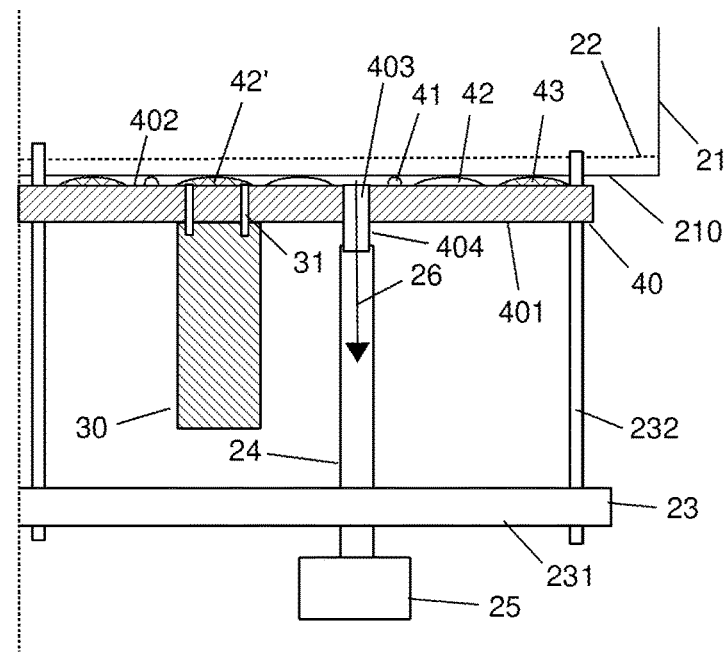
FIG. 10 shows a sectional view of the assembly of FIG. 9, after a suction time.

Preferably, suction is maintained during a large part of the polymerisation step 68, at least until a degree of polymerisation of at least 80% is achieved, as shown by the reference numeral 26 in FIG. 10, which shows this polymerisation step 68 of the method according to the invention. This advantageously prevents the appearance of holes or other defects in the adhesive joints being formed.

Figure 11:
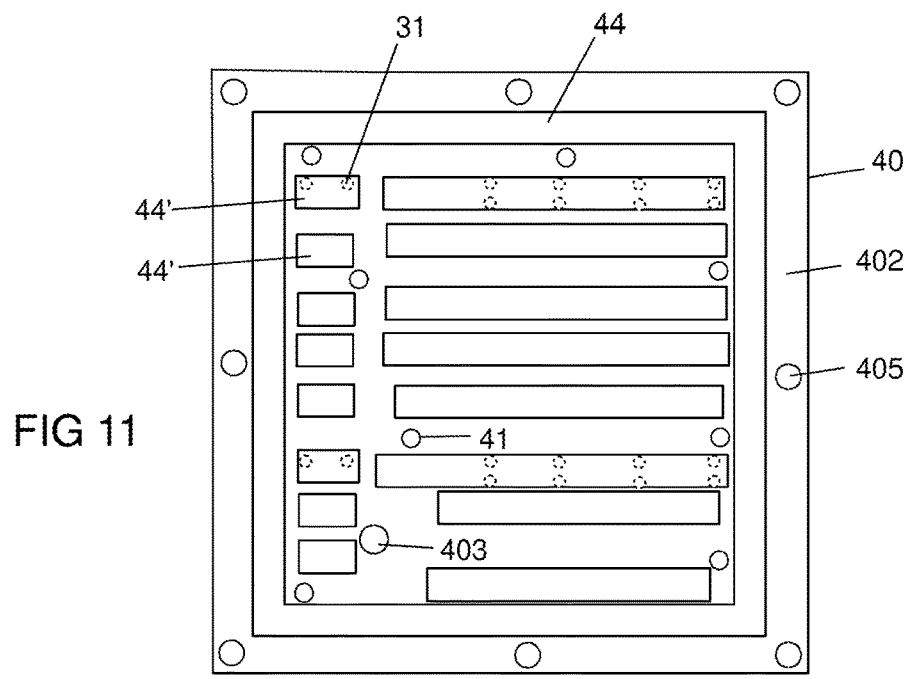
FIG. 11 shows a view of the second face of the plate of the assembly shown in FIG. 10.
Figure 12:
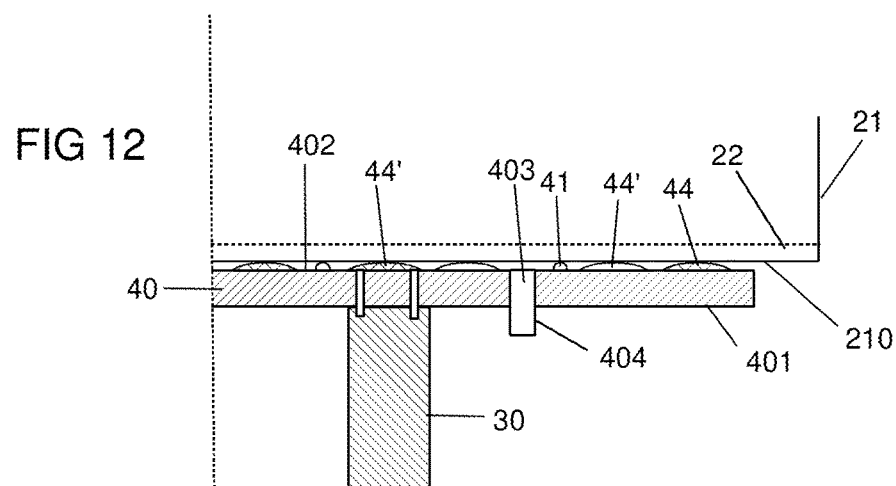
FIG. 12 shows a sectional view of the assembly shown in FIG. 10 after the removal of the clamping tool in accordance with the invention.

At the end of this step, the second face 402 of the plate 40 is configured as shown in FIGS. 11 and 12. FIG. 11 shows the configuration of the second face 402 of the plate 40, which is effectively bonded by the adhesive joints against the face 210 of the support structure 21. Adhesive joints, comprising a peripheral adhesive joint 44 and disjointed inner adhesive joints 44', have been formed on the plate 40, each by the spreading of a bead 43, 42, 42' and polymerisation of the polymerisable adhesive composition of which these beads were made. FIG. 12 shows a sectional view of the assembly obtained, after the suction has been interrupted, the suction hose 24 has been disconnected from the fluid connector 404, and the clamping tool removed.

The method according to the invention was simple and quick to implement. It has made it possible to carry out, as diagrammatically shown in FIG. 13, the assembly of the devices 30, 30' on the support structure 21 of the satellite 20, by means of the plate 40 and of the set of adhesive joints 44, 44' formed between the plate 40 and the support structure 21, these joints having a uniform height and being free of defects. This assembly advantageously meets the requirements of the space field in terms of weight, mechanical strength and heat flow dissipation capacity.

The invention claimed is:

1. A method for assembling a plurality of devices on a support structure of an artificial satellite, comprising successive steps of:
   attaching, via attachment members, each of said devices to a first face of a plate, said plate being drilled with a through-hole provided, at said first face of the plate, with a fluid connector;
   on a second face of the plate opposite said first face, depositing a continuous peripheral bead of a first polymerisable adhesive composition and, within the perimeter formed by said peripheral bead, depositing a plurality of discontinuous and disjointed inner beads of a second polymerisable adhesive composition, the through-hole being included within said perimeter formed by the peripheral bead;
   pressing said second face of the plate against a continuous face of said support structure;
   performing suction, via said fluid connector, so as to create a negative pressure between said plate and said support structure, in the volume delimited by said peripheral bead;
   at least partially polymerising each of said polymerisable adhesive compositions so as to form adhesive joints between said second face of the plate and said support structure; and
   interrupting the suction.

2. The method according to claim 1, wherein said first polymerisable adhesive composition and said second polymerisable adhesive composition are chosen from among thermosetting resins.

3. The method according to claim 1, wherein said first polymerisable adhesive composition and said second polymerisable adhesive composition are identical.

4. The method according to claim 1, comprising, prior to the pressing of said second face of the plate against said face of said support structure, attaching, to said second face, a plurality of templates, the height whereof is less than the height of said beads of polymerisable adhesive composition.

5. The method according to claim 1, wherein at least one inner bead is disposed opposite each of said devices.

6. The method according to claim 1 wherein, when said support structure contains integrated heat pipes, the deposition of said inner beads of a second polymerisable adhesive composition and the pressing of said second face of the plate against said face of said support structure are carried out in such a way that at least one of said inner beads crosses one of said heat pipes.

7. The method according to claim 1, wherein the suction is performed so as to obtain a relative pressure between said plate and said support structure of between −0.1 and −0.75 bar.

8. The method according to claim 1, wherein the suction is maintained throughout the duration of the step of at least partially polymerising said polymerisable adhesive compositions.

9. The method according to claim 1, comprising a step of clamping the plate against the support structure, prior to performing suction.

10. A support structure of an artificial satellite, on which a plurality of devices is assembled, wherein said devices are attached by attachment members to a first face of a plate, and a second face of said plate, opposite said first face, is attached against a continuous face of said support structure by adhesive joints comprising a continuous peripheral adhesive joint and, within the perimeter formed by said peripheral adhesive joint, a plurality of discontinuous and disjointed adhesive joints, wherein said plate has a thickness, measured between said first face and said second face, comprised between 1 and 3 mm.

11. A support structure of an artificial satellite, on which a plurality of devices is assembled, wherein said devices are attached by attachment members to a first face of a plate, and a second face of said plate, opposite said first face, is attached against a continuous face of said support structure by adhesive joints comprising a continuous peripheral adhesive joint and, within the perimeter formed by said peripheral adhesive joint, a plurality of discontinuous and disjointed adhesive joints, wherein said adhesive joints are made of thermoset resin.

12. A support structure of an artificial satellite, on which a plurality of devices is assembled, wherein said devices are attached by attachment members to a first face of a plate, and a second face of said plate, opposite said first face, is attached against a continuous face of said support structure by adhesive joints comprising a continuous peripheral adhesive joint and, within the perimeter formed by said peripheral adhesive joint, a plurality of discontinuous and disjointed adhesive joints, wherein said adhesive joints have the same height.

13. A support structure of an artificial satellite, on which a plurality of devices is assembled, wherein said devices are attached by attachment members to a first face of a plate, and a second face of said plate, opposite said first face, is attached against a continuous face of said support structure by adhesive joints comprising a continuous peripheral adhesive joint and, within the perimeter formed by said peripheral adhesive joint, a plurality of discontinuous and disjointed adhesive joints, wherein at least one adhesive joint is disposed opposite each of said devices.

14. A support structure of an artificial satellite, on which a plurality of devices is assembled, wherein said devices are attached by attachment members to a first face of a plate, and a second face of said plate, opposite said first face, is attached against a continuous face of said support structure by adhesive joints comprising a continuous peripheral adhesive joint and, within the perimeter formed by said peripheral adhesive joint, a plurality of discontinuous and disjointed adhesive joints, wherein said support structure contains integrated heat pipes, and at least one of said adhesive joints crosses one of said heat pipes.

15. An artificial satellite including a support structure, on which a plurality of devices is assembled, wherein said devices are attached by attachment members to a first face of a plate, and a second face of said plate, opposite said first face, is attached against a continuous face of said support structure by adhesive joints comprising a continuous peripheral adhesive joint and, within the perimeter formed by said peripheral adhesive joint, a plurality of discontinuous and disjointed adhesive joints, wherein at least one adhesive joint is disposed opposite each of said devices.

16. The method according to claim 5, wherein at least one inner bead is disposed opposite each of said devices at said attachment members or in the vicinity of said attachment members.

17. The method according to claim 6, wherein the deposition of said inner beads of a second polymerisable adhesive composition and the pressing of said second face of the plate against said face of said support structure are carried out in such a way that at least one of said inner beads crosses one of said heat pipes perpendicularly to said heat pipe.

18. The structure according to claim 13, wherein at least one adhesive joint is disposed opposite each of said devices at said attachment members.

19. The structure according to claim 14, wherein at least one of said adhesive joints crosses one of said heat pipes perpendicularly to said heat pipe.

20. An artificial satellite including a support structure, on which a plurality of devices is assembled, wherein said devices are attached by attachment members to a first face of a plate, and a second face of said plate, opposite said first face, is attached against a continuous face of said support structure by adhesive joints comprising a continuous peripheral adhesive joint and, within the perimeter formed by said peripheral adhesive joint, a plurality of discontinuous and disjointed adhesive joints, wherein said support structure contains integrated heat pipes, and at least one of said adhesive joints crosses one of said heat pipes.

* * * * *